UNITED STATES PATENT OFFICE.

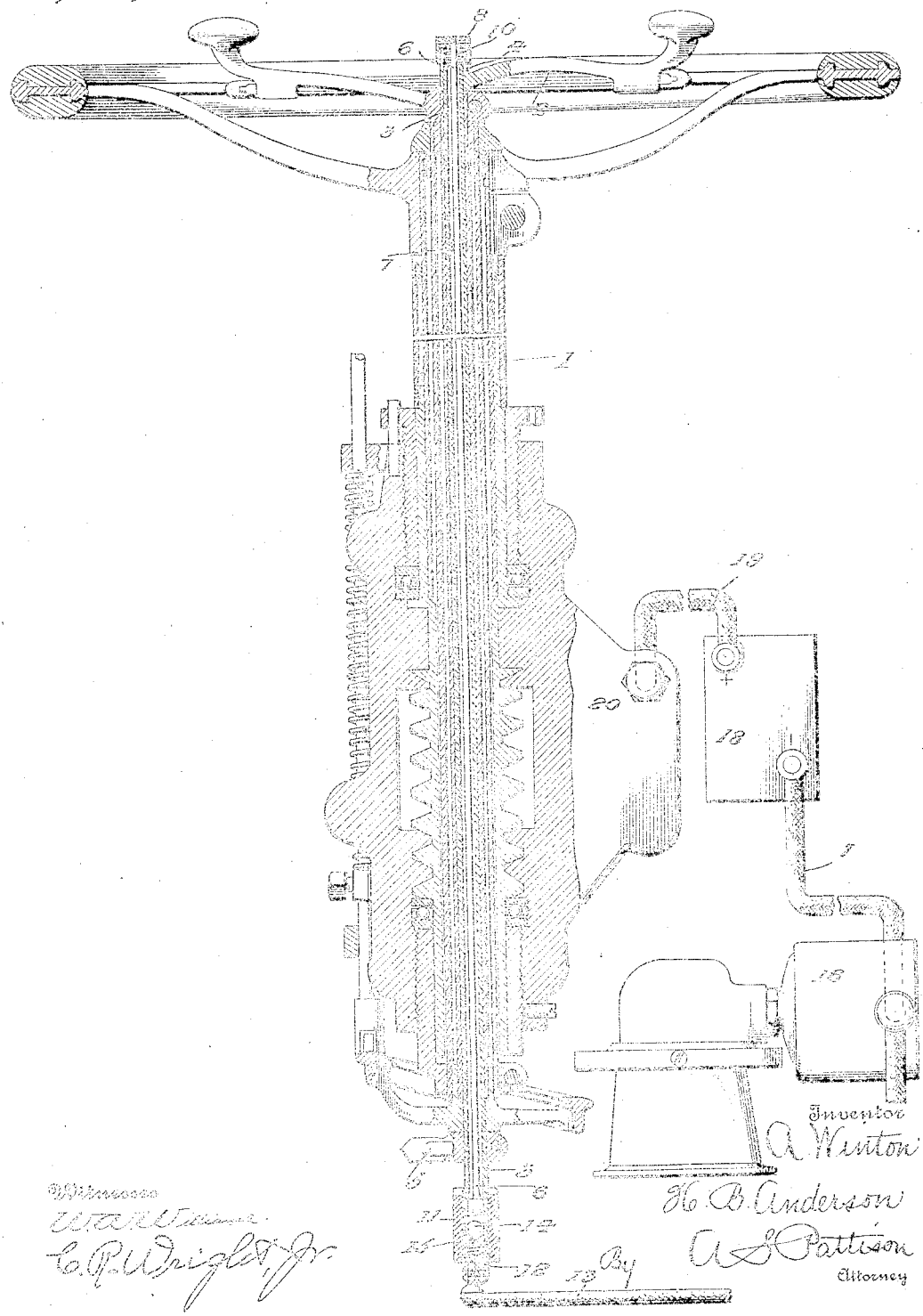

ALEXANDER WINTON AND HAROLD B. ANDERSON, OF CLEVELAND, OHIO, ASSIGNOR TO THE WINTON MOTOR CARRIAGE COMPANY, OF CLEVELAND, OHIO.

SIGNAL DEVICE FOR AUTOMOBILES.

1,108,052.  Specification of Letters Patent.  Patented Aug. 18, 1914.

Application filed July 8, 1913. Serial No. 777,945.

*To all whom it may concern:*

Be it known that we, ALEXANDER WINTON and HAROLD B. ANDERSON, citizens of the United States, residing at Cleveland, in the county of Cuyahoga and State of Ohio, have invented certain new and useful Improvements in Signal Devices for Automobiles, of which the following is a specification, reference being had therein to the accompanying drawing.

Our invention relates to improvements in signal devices for automobiles.

The object of our invention is to provide an automobile signal device operated through the steering column, whereby it is in ready access to the driver of the auto and can be readily operated by either hand.

Another object of our invention is to provide a device of this character which is simple in construction and arrangement of parts and has certain details of structure hereinafter more fully set forth.

In the accompanying drawings the figure is a vertical sectional view of a steering column showing the signal diagrammatically.

Referring now to the drawings, 1 represents the steering column having the usual spark and the throttle levers, etc., arranged thereon and which needs no further description, as our device is applicable to any steering column. As shown in the drawings, the spark lever or the throttle lever 2, whichever it may be, is mounted upon the tube 3 and has the upwardly projecting flange 4, the purpose of which will be hereinafter more fully described. The tube 3, as shown, extends entirely through the steering column and has mounted thereon below the same a lever or crank arm 5, as is well understood. The tube 3 has extending therethrough a rod 6, which has a free longitudinal movement therethrough and which is held in the center of the tube by means of the blocks 7. The upper end of the rod 6 extends above the flange 4 and is provided with a cap 8, which is rigidly secured to the rod and adapted to pass over the upwardly projecting flange 4 of the spark or throttle lever, whichever it might be, and is free to move vertically thereon. Within the cap and surrounding the rod 6 is a coiled spring 10, which has its upper end bearing against the upper end of the cap and its lower end bearing against the upper end of the tube 3, whereby the cap and the rod 6 are normally held in their upward position, as will be readily understood. The tube 3, below the crank arm 5, is provided with an insulated bushing 11, which is threaded onto the tube 3. Screwed within the lower end of the insulated bushing 11 is a contact 12, to which is connected the insulated wire 13, running to the electric horn, hereinafter fully described. This arrangement of the contact below the steering column makes it very accessible in case of a short circuit, and it is also impossible for water or dirt to get into the contact proper. The contact between the rod 6 and the contact 12 is in the form of a ball 14, which is normally held upwardly by a spring 15 away from the contact 12, which further insures of a breaking of the circuit when the cap on the upper end of the rod 6 is released. The wire 13 leads to the electric horn 16 and the other pole of the operating means of the horn is connected to the wire 17, which leads to the battery 18. The battery by means of the wire 19 is grounded to the machine and, as shown, is connected to the support 20 of the steering column. By this arrangement it will be seen that the circuit is completed through the rod 6.

Having thus described our invention, what we claim and desire to secure by Letters Patent is:

1. The combination with a steering column of an automobile, of a signal and a circuit closure passing through the steering column for closing the circuit below the lower end of the column for operating said signal.

2. The combination with a steering column of an automobile, of a signal adjacent thereto, a rod passing through the steering column, a push button rigidly carried by the upper end of the rod, means carried by the lower end of the rod below the steering column for closing the circuit to the electric signal.

3. The combination with a steering column of an automobile, of an electrically operated signal having one pole thereof grounded to the machine, a rod passing through the steering column and adapted to close the circuit below the lower end of the steering column between the grounded wire and the other wire of the signal.

4. The combination of a steering column of an automobile, of an electrically operated signal, a rod passing through the steering column, a push button secured to the rod above the steering column, a spring surrounding the rod and normally holding the button in an upward position and means carried by the lower end of the rod below the lower end of the steering column for closing the circuit to the electrically operated signal.

5. The combination with a steering column of an automobile, of a throttle operating tube passing through the steering column, an electrically operated signal, a rod passing through the throttle operating tube, an insulated bushing carried by the lower end of the throttle operating tube below the steering column and into which the rod passes, and an electrical contact within the bushing and connected to one pole of the electrically operated signal and the other pole grounded to the machine, whereby the circuit is closed through the rod.

6. The combination with a steering column of an automobile, a throttle tube passing through the steering column, an electrically operated signal, one pole of said signal grounded to the machine, an insulated bushing carried by the lower end of the throttle tube below the steering column, a contact carried by the bushing and connected to the other pole of the electrically operated signal, a rod passing through the steering column and into the bushing, a cap carried by the upper end of the rod above the steering column, a coiled spring surrounding the rod, and engaging the cap and normally holding the same and the rod in its upward position, whereby the downward movement of the cap causes the lower end of the rod to form an electric connection with the contact in the bushing.

7. The combination with the steering column, of a signal, an insulated bushing carried by the lower end of the steering column, a circuit closure within the bushing and a rod passing downwardly through the steering column and adapted to close the circuit closure for operating said signal.

8. The combination with a steering column, of an electrically operated signal, a bushing carried by the lower end of the steering column, a circuit closure within said bushing and a rod extending through the steering column and operated from its lower end and adapted to operate the circuit closure to the electrically operated signal.

9. The combination with a steering column of an automobile, of an electrically operated signal, one pole of said signal grounded to the machine, an insulating bushing carried by the lower end of the throttle tube below the steering column, a contact carried by the bushing and connected to the other pole of the electrically operated signal, a rod passing through the steering column and into the bushing, and a pole within the bushing and normally held upwardly by a spring and away from the contact, whereby it is depressed by the downward movement of the rod to complete the circuit with the contact carried by the bushing.

10. The combination with the steering column of an automobile, of an electrically operated signal, an insulated bushing carried by the lower end of the steering column, a circuit closure within the bushing for said signal, and a rod passing through the steering column and adapted to operate the circuit closure, substantially as shown and described.

11. The combination with a steering column of an automobile, of an electrically operated signal, an insulated bushing carried by the lower end of the steering column, a circuit closure within the bushing and normally held open by a spring, a rod passing downwardly through the steering column and operated from the upper end of the steering column for closing the circuit closure, whereby the electrically operated signal is set in operation.

12. The combination with a steering column of an automobile, of an electrically operated signal adjacent thereto, an insulated bushing carried by the lower end of the steering column, a contact carried by the lower end of the bushing and connected to the signal, an upwardly spring-pressed member carried by the bushing and held away from the contact, a rod passing through the steering column and operated from its upper end and having its lower end normally in engagement with the upwardly spring pressed member, and means whereby the said rod may be forced downwardly for causing the spring-pressed member to engage the contact for closing the circuit to the electrically operated signal.

In testimony whereof we hereunto affix our signatures in the presence of two witnesses.

ALEXANDER WINTON.
HAROLD B. ANDERSON.

Witnesses:
  M. J. WARD,
  G. M. LAVELLE.